(12) United States Patent
Lippert et al.

(10) Patent No.: US 9,697,605 B2
(45) Date of Patent: Jul. 4, 2017

(54) METHOD FOR THE MICROSCOPIC THREE-DIMENSIONAL REPRODUCTION OF A SAMPLE

(71) Applicant: Carl Zeiss MicroImaging GmbH, Jena (DE)

(72) Inventors: Helmut Lippert, Jena (DE); Benno Radt, Jena (DE); Michael Kempe, Jena (DE); Christian Dietrich, Jena (DE)

(73) Assignee: CARL ZEISS MICROSCOPY GMBH, Jena (DE)

(*) Notice: Subject to any disclaimer, the term of this patent is extended or adjusted under 35 U.S.C. 154(b) by 449 days.

(21) Appl. No.: 13/705,237

(22) Filed: Dec. 5, 2012

(65) Prior Publication Data

US 2013/0094755 A1 Apr. 18, 2013

Related U.S. Application Data

(62) Division of application No. 12/680,056, filed as application No. PCT/EP2008/007686 on Sep. 16, 2008, now abandoned.

(30) Foreign Application Priority Data

Sep. 26, 2007 (DE) .................. 10 2007 045 897

(51) Int. Cl.
*G06T 7/00* (2006.01)
*G02B 21/00* (2006.01)
(Continued)

(52) U.S. Cl.
CPC .......... *G06T 7/0022* (2013.01); *G02B 21/002* (2013.01); *G02B 21/244* (2013.01); *G02B 21/367* (2013.01); *G06T 7/97* (2017.01)

(58) Field of Classification Search
CPC ...... F22B 29/02; F22B 37/303; G02B 21/002; G02B 21/244; G02B 21/367; G02B 21/365; G06T 7/0022; H04N 7/18; G01N 21/6458
(Continued)

(56) References Cited

U.S. PATENT DOCUMENTS 5,109,276 A * 4/1992 Nudelman .......... A61B 1/00193
257/E31.115
6,114,695 A * 9/2000 Todokoro ............... G01B 15/00
250/307

(Continued)

FOREIGN PATENT DOCUMENTS

DE 37 39 223 6/1989
DE 10 2005 027 077 5/2006
(Continued)

OTHER PUBLICATIONS

Toprak et al "Three-Dimensional Particle Tracking via Bifocal Imaging", Jun. 6, 2007.*
(Continued)

*Primary Examiner* — Shan Elahi
(74) *Attorney, Agent, or Firm* — Haug Partners LLP

(57) ABSTRACT

A method for the three-dimensional imaging of a sample in which image information from different depth planes of the sample is stored in a spatially resolved manner, and the three-dimensional image of the sample is subsequently reconstructed from this stored image information is provided. A reference structure is applied to the illumination light, at least one fluorescing reference object is positioned next to or in the sample, images of the reference structure of the illumination light, of the reference object are recorded from at least one detection direction and evaluated. The light sheet is brought into an optimal position based on the results and image information of the reference object and of the
(Continued)

sample from a plurality of detection directions is stored. Transformation operators are obtained on the basis of the stored image information and the reconstruction of the three-dimensional image of the is based on these transformation operators.

11 Claims, 3 Drawing Sheets

(51) Int. Cl.
  G02B 21/24 (2006.01)
  G02B 21/36 (2006.01)
(58) Field of Classification Search
  USPC .......................................................... 348/79
  See application file for complete search history.

(56) References Cited

U.S. PATENT DOCUMENTS

| | | | | |
|---|---|---|---|---|
| 7,601,938 B2* | 10/2009 | Cartlidge | ........... | G02B 27/0012 250/208.1 |
| 7,634,129 B2* | 12/2009 | Strom | ........... | G06T 1/0007 345/419 |
| 8,164,622 B2* | 4/2012 | Crandall | ........... | G02B 21/367 348/78 |
| 8,212,866 B2* | 7/2012 | Lemmer | ........... | G01N 21/6428 324/307 |
| 9,041,793 B2* | 5/2015 | Bugge | ........... | G02B 21/002 348/61 |
| 2001/0005586 A1* | 6/2001 | Palsson | ........... | C12M 35/02 435/40.5 |
| 2002/0118453 A1* | 8/2002 | Geier | ........... | G02B 21/22 359/465 |
| 2002/0158966 A1* | 10/2002 | Olschewski | ........... | G01B 9/04 348/79 |
| 2003/0071893 A1* | 4/2003 | Miller | ........... | A61B 3/0058 348/42 |
| 2003/0122828 A1* | 7/2003 | Lukyanitsa | ........... | G03H 1/22 345/440 |
| 2003/0151735 A1* | 8/2003 | Blumenfeld | ........... | G01N 21/6428 356/73 |
| 2003/0160784 A1* | 8/2003 | Kopelman | ........... | A61C 9/0006 345/419 |
| 2003/0160864 A1* | 8/2003 | Kremen | ........... | G02B 5/1885 348/51 |
| 2004/0002154 A1* | 1/2004 | Palsson | ........... | G01N 33/48 435/446 |
| 2004/0029213 A1* | 2/2004 | Callahan | ........... | G01N 15/1475 382/128 |
| 2004/0257360 A1* | 12/2004 | Sieckmann | ........... | G06T 17/05 345/419 |
| 2005/0036667 A1* | 2/2005 | So | ........... | G06K 9/00127 382/128 |
| 2005/0047640 A1* | 3/2005 | Eisfeld | ........... | G06K 9/00127 382/133 |
| 2005/0059886 A1* | 3/2005 | Webber | ........... | G01N 23/046 600/426 |
| 2005/0117118 A1* | 6/2005 | Miller | ........... | A61B 3/13 351/246 |
| 2005/0168616 A1* | 8/2005 | Rastegar | ........... | H04N 5/2259 348/335 |
| 2005/0213090 A1* | 9/2005 | Namba | ........... | G01N 21/6408 356/318 |
| 2005/0259864 A1* | 11/2005 | Dickinson | ........... | G06K 9/00134 382/154 |
| 2006/0011824 A1* | 1/2006 | Engelmann | ........... | G02B 21/002 250/238 |
| 2006/0050146 A1* | 3/2006 | Richardson | ........... | G01J 3/10 348/80 |
| 2006/0126921 A1* | 6/2006 | Shorte | ........... | G02B 21/22 382/154 |
| 2007/0041627 A1* | 2/2007 | Douglass | ........... | G01N 15/1475 382/133 |
| 2007/0121111 A1* | 5/2007 | Blumenfeld | ........... | G06T 1/0007 356/318 |
| 2007/0147673 A1* | 6/2007 | Crandall | ........... | G02B 21/367 382/128 |
| 2009/0080048 A1* | 3/2009 | Tsao | ........... | G02B 7/102 359/211.1 |
| 2010/0141829 A1* | 6/2010 | Jalali | ........... | A61B 1/00009 348/370 |
| 2010/0201784 A1* | 8/2010 | Lippert | ........... | G02B 21/002 348/46 |
| 2013/0147919 A1* | 6/2013 | Xia | ........... | H04N 13/0203 348/46 |
| 2014/0015935 A1* | 1/2014 | Piestun | ........... | G06T 7/77 348/46 |
| 2014/0036042 A1* | 2/2014 | Xia | ........... | G02B 21/361 348/49 |
| 2014/0063194 A1* | 3/2014 | Zhuang | ........... | G01N 21/6428 348/46 |
| 2016/0195705 A1* | 7/2016 | Betzig | ........... | G02B 5/005 348/79 |

FOREIGN PATENT DOCUMENTS

| | | | | |
|---|---|---|---|---|
| DE | 102005027077 A1 | * | 5/2006 | ........... G02B 21/06 |
| EP | 1 491 936 | | 12/2004 | |
| WO | WO 98/45745 | | 10/1998 | |
| WO | WO 99/42885 | | 8/1999 | |
| WO | WO 2004/053558 | | 6/2004 | |
| WO | WO 2006/008300 | | 1/2006 | |
| WO | WO 2006/111965 | | 10/2006 | |

OTHER PUBLICATIONS

DE102002027077AMT, German prior art DE102005027077 A1, machine tranlation generated, May 2006.*
DiMarzio et al, Three-Dimensional Multi-Modal Microscopy, 2009.*
Liao et al, Reconstruction of Dynamic 3-D Structures of Biological Objects Using Stereo Microscopy, 1994.*
Jim Swoger et al.; "Multi-view image fusion improves resolution in three-dimensional microscopy"; Optics Express; Jun. 25, 2007; vol. 15; No. 13; pp. 8029-8042.
Jan Huisken et al.; "Even fluorescence excitation by multidirectional selective plane illumination microscopy (Mspim)"; Optics Letters; Sep. 1, 2007; vol. 32; No. 17; pp. 2608-2610.

* cited by examiner a)

b)

METHOD FOR THE MICROSCOPIC THREE-DIMENSIONAL REPRODUCTION OF A SAMPLE

The present application is a divisional of U.S. patent application Ser. No. 12/680,056 filed on Mar. 25, 2010, which claims priority from PCT Patent Application No. PCT/EP2008/007686 filed on Sep. 16, 2008, which claims priority from German Patent Application No. 10 2007 045 897.7 filed on Sep. 26, 2007, the disclosures of which are incorporated herein by reference in their entirety.

FIELD OF THE INVENTION

The present invention relates to a system and a method for mutual authentication in which a higher-level device and a lower-level device mutually authenticate each other.

The invention is directed to a method for the three-dimensional imaging of a sample in which image information from different depth planes of the sample is acquired from at least one detection direction and is stored in a spatially resolved manner, i.e., correlated to its spatial coordinates X, Y, Z, and in which the three-dimensional image of the sample is subsequently reconstructed electronically from this image information.

It is noted that citation or identification of any document in this application is not an admission that such document is available as prior art to the present invention.

It is known to obtain microscopic three-dimensional images, for example, using the principle of laser scanning microscopy (LSM). For this purpose, a pinhole diaphragm which is irradiated by laser light is projected in the sample and illuminates this sample with the intensity distribution of an Airy disk. The image of this illuminated sample point occurs on a measurement diaphragm which is conjugate to the illumination diaphragm with respect to position and size. To acquire an expanded sample field, this sample field is scanned by means of optical scanning. The image information which is obtained in so doing is stored electronically and the three-dimensional image is reconstructed from the stored data. In laser scanning microscopy (LSM), the image quality depends substantially on the position and aperture size of the measurement diaphragm relative to the position of the pinhole diaphragm, i.e., the pinhole diaphragm should be aligned in such a way that it is imaged on the measurement diaphragm with great accuracy.

Another principle used for obtaining microscopic three-dimensional images which was discovered only recently is known as selective plane illumination microscopy or single plane illumination microscopy (SPIM).

In contrast to confocal laser scanning microscopy (LSM), SPIM technology is based on widefield microscopy and makes it possible to generate three-dimensional images of a sample based on optical sections through different planes of the sample.

The advantages of SPIM include faster acquisition of image information, reduced risk of bleaching out biological samples, and the possibility of adjusting the horizontal resolution of the image independent from the depth resolution.

Basically, in the SPIM technique fluorophores which are contained inherently in the sample or are introduced into the sample specifically for contrasting are excited by laser light, the laser radiation being shaped to form a light sheet, as it is called. A selected depth plane in the sample is illuminated by the light sheet, and image information is obtained from this sample plane in the form of an optical section by imaging optics. For this purpose, the excitation beam path is separated from the detection beam path.

The length and width of the light sheet extend perpendicular to the optical axis of the microscope objective in coordinates X and Y and are adapted to the sample field to be analyzed and the light sheet has a thickness extending in direction of the optical axis of the microscope objective within a range of a few μm.

An example of the SPIM method is known from WO2004/053558 A1. The sample to be analyzed, for example, a medaka embryo, is embedded in an aqueous gel in which it continues to live for a certain period of time. The light sheet can either be generated directly, e.g., through cylindrical optics, or as a quasi light sheet by scanning a line-shaped beam over the object area.

Since the excitation beam path in the SPIM method is decoupled from the detection beam path in a different way on principle compared to LSM, an additional adjustment step is required which involves the precise orientation of the light sheet on the focus plane of the detection objective that is used. According to the prior art, a mirror is generally used for this purpose. This mirror is arranged in the sample space in place of the sample and reflects the light sheet toward the detection objective. An adjustment can be carried out by means of reference structures on the mirror (e.g., in the form of scratches) and based on the thickness and position of the light stripe which is generated by the light sheet and visible on the mirror.

One problem with this is that measurement is not carried out directly at the sample; another is that the adjustment is carried out at a laser wavelength which does not correspond to the emission wavelength coming from the sample, which is actually the wavelength of interest, so that any chromatic longitudinal errors, e.g., of the detection objective, are not taken into account.

The adjustment of the light sheet based directly on the sample is desirable, but a suitable method for this is not known from the prior art.

Another problem with the SPIM method becomes apparent when reconstructing three-dimensional images of a sample from image information acquired from different detection directions. The amount of data to be processed is so extensive that efficient algorithms are required for overlapping and fusing the stack of images obtained from the different detection directions through comparison of structures through translational, rotational and deformation operations within a suitable time period. This is all the more true when the comparison is based on structures presented by the sample itself, which may be more or less pronounced depending on the detection direction and rotational angle because, e.g., shadow effects, may play a role. The registration, i.e., the acquisition of image information and the necessary operation rules, is then very costly and time-consuming, and commercially available computers are usually not suitable for handling the required computing capacity.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

Therefore, it is the object of the invention to provide method steps which ensure an enhanced imaging quality in the three-dimensional imaging of a sample.

This object is met by a method of the type mentioned above in a first variant which is applicable, for example, in microscopic three-dimensional imaging of samples by laser scanning microscopy (LSM) in that:
- at least one reference object is positioned next to or in the sample, the detection direction from which the image information is acquired is changed repeatedly relative to the sample and relative to the reference object,
- from each detection direction given by a change:
    - image information is acquired from the reference object and is stored in a spatially resolved manner in spatial coordinates X, Y, Z, and
    - image information is acquired from different depth planes of the sample and is stored in a spatially resolved manner in spatial coordinates X, Y, Z,
- based on the spatial coordinates X, Y, Z of the stored image information from the reference object, transformation operators can be obtained for translation, rotation and deformation, by means of which image information from the same source from the different detection directions can be overlapped, and
- subsequently, the reconstruction of the three-dimensional image of the sample from the spatial coordinates X, Y, Z of the image information obtained from the sample is based on these transformation operators.

The reference object should have a structure serving as a reference structure so that the stored spatial coordinates X, Y, Z of this reference structure can be used to obtain transformation operators.

By overlapping is meant within the meaning of the invention that the image information which has the same origin in the reference structure and in the sample but which does not overlap in the individual image stacks because of the different detection directions is brought into alignment in the registered three-dimensional view.

The transformation operators which are related to their respective spatial coordinates X, Y, Z in the form of a rule for translation, rotation and deformation of the image information which is acquired from the individual detection directions and stored are used for this purpose. This rule is then taken as a basis for the reconstruction of the three-dimensional image of the sample.

An object, preferably in the form of a pin, a needle, a fiber or a thread, can be used as a reference object. It is also possible to use particles, e.g., fluorescing or non-fluorescing beads or microspheres.

The object of the invention is met by a method of the type mentioned above in a second variant which relates to the above-mentioned method of selective plane illumination microscopy (SPIM) and in which the three-dimensional imaging:
- is obtained from a sample comprising a fluorescing substance or from a sample to which a fluorescing substance is added,
- the sample is illuminated by an excitation beam which is shaped as a light sheet, and
- the image information from the sample is obtained based on the emission radiation coming from the sample.

According to the invention, it is provided that:
- at least one reference object comprising a fluorescing substance or a reference object having a fluorescing substance is positioned next to or in the sample,
- the detection direction from which the image information is acquired is repeatedly changed relative to the sample and relative to the reference object, wherein
- from each detection direction given by a change:
    - image information is acquired from the reference object and is stored in a spatially resolved manner in spatial coordinates X, Y, Z, and
    - image information is acquired from different depth planes of the sample and is stored in a spatially resolved manner in spatial coordinates X, Y, Z,
- based on the spatial coordinates X, Y, Z of the stored image information from the reference object, transformation operators can be obtained for translation, rotation and deformation, by means of which image information from the same source from the different detection directions can be overlapped, and
- subsequently, the reconstruction of the three-dimensional image of the sample from the spatial coordinates X, Y, Z of the image information obtained from the sample is based on these transformation operators.

As was already mentioned above, it is important in selective plane illumination microscopy (SPIM) to correctly align the light sheet in the focus plane of the respective detection objective being used. Therefore, in a particularly preferred embodiment of the second variant of the invention mentioned above:
- a reference structure in the form of an irregular intensity distribution is applied to the illumination light, and
- prior in time to the acquisition of the image information of the reference object and of the sample from at least one of the given detection directions:
    - images of the reference structure of the illumination light, of the reference structure of the reference object, or of a sample structure which is suitable as a reference structure are recorded and evaluated with respect to the sharpness of their imaging, then
    - the light sheet is displaced in this detection direction into the position in which the sharpest imaging of the reference structure is achieved in an observation plane, and/or
    - the light sheet is oriented in such a way that the reference structure is sharply imaged in a homogeneous manner over the entire image field.

By displacing the light sheet in the detection direction, this light sheet is brought into the focus plane of the microscope objective. Tilting of the light sheet relative to the focus plane is compensated by orienting the light sheet on the basis of the homogeneity of the imaging sharpness over the entire image field.

This adjustment of the light sheet preceding the acquisition of the image information is carried out on the basis of the reference structure in-situ, i.e., while the sample remains in the sample space. The precise orientation of the light sheet in the focus plane is an essential condition for a higher-quality three-dimensional imaging of the sample.

The illumination light is structured, for example, in that a grating is introduced in a plane of the illumination beam path conjugate to the object plane of the detection objective so that the light sheet is modulated in a grating-shaped manner in the focal plane. When a fluorescing sample is located in the area of the light sheet, the fluorescence is modulated correspondingly over the image field and the grating is made visible as a reference structure.

Another possibility is presented when the light sheet is generated, in effect, by the scanning of a line-shaped beam. In this case, a simple temporal modulation of the illumination intensity is sufficient for generating a spatial modulation in the sample space.

Also, when applying selective plane illumination microscopy (SPIM), the reference object should have a structure which is usable as a reference structure so that the spatial coordinates X, Y, Z which are acquired from this reference structure and stored can advantageously be used to obtain the transformation operators.

For the sake of clarity and to help distinguish between the two, the reference structure impressed on the illumination light is referred to in the following as an indirect reference structure and the structure of the reference object is referred to as a direct reference structure.

It also lies within the scope of the invention to use the direct reference structure instead of an indirect reference structure for adjusting the light sheet. For this purpose, in a manner analogous to the above-described procedure based on the indirect reference structure, the light sheet is displaced in the detection direction until the direct reference structure is sharply imaged in the observation plane. Also, the light sheet is oriented in such a way that the imaging of the direct reference structure is carried out homogeneously over the image field.

The advantage of using a reference structure to assist in adjusting the light sheet and in acquiring the image information consists in that the reference structure is not dependent on the sample structure and is therefore less subject, or not at all subject, to the artifacts predominantly caused by the sample itself.

An object, for example, in the form of a pin, a needle, a fiber or a thread, or the like can also conceivably be used as reference objects in connection with selective plane illumination microscopy (SPIM). However, they must be made at least partially from a fluorescing material.

It is particularly advantageous to use a needle with a fluorescing needle tip and to position the sample on the tip of the needle as will be explained in more detail in the following referring to an application example.

Alternatively, it is conceivable that a plurality of reference objects in the form of particles which fluoresce when excited are positioned together with the sample in a gel. In so doing, at least three particles should be used if these particles are to be used for registration. Considerably more particles are advantageous for adjusting the light sheet.

The sample itself can be dyed, for example, with enhanced green fluorescent protein (EGFP) so that it fluoresces green when excited. Agarose gel can advantageously be used as a gel for embedding the sample.

In both variants of the invention, the detection direction is preferably changed by rotating the sample relative to the detection direction defined by the detection objective. The purpose of this procedure is to avoid shadow effects or to achieve a more homogeneous resolution.

The computational electronic reconstruction will be described in more detail in the following. In both variants of the invention, this reconstruction consists in that on the one hand, the image information obtained from the different detection directions from different depth planes of the sample are registered in the form of image stacks, and on the other hand, these image stacks are then fused to form the three-dimensional image of the sample.

When registering the image information, the image information originating from the sample is not considered at all at first; rather, a comparison of structures is carried out based only on the direct reference structure.

To this end, filtering is carried out by means of hardware or software, i.e., the image information of the reference structure is separated from the image information of the sample. This is accomplished, for example, with the help of different shapes of the reference structure or based on different emission spectra or polarization characteristics.

The amount of image information of the reference structure is less by orders of magnitude than the amount of image information of the sample. This substantially reduces the resources required for processing.

Based on the direct reference structure, i.e., based on spatial coordinates X, Y, Z of the reference object, the transformation operators are obtained in the form of a rule for translation, rotation and deformation so that the image information which is acquired from the individual detection directions and stored in image stacks can be overlapped with the image information of a different detection direction.

This rule is given, for example, in the form of a matrix which renders the translation, rotation and possibly also deformation operations to be applied to the coordinates of the voxels of the image stack. The matrix obtained on the basis of the image information of the reference structure is now applied to the image information of the actual sample.

To acquire the image information from plurality of different detection directions, it is possible to rotate the sample several times by 90° until a revolution of 360° is executed and image information from four detection directions is stored. Of course, any other rotational angle and a corresponding quantity of detection directions also lie within the scope of the invention.

Further, according to the invention, the image information of the sample and the image information of the at least one reference object are acquired either simultaneously or successively in time. In an advantageous manner, the image information of the sample and reference structure is acquired simultaneously through different detectors, for example, through spectral splitting when the sample and reference object have different emission characteristics.

In a particularly advantageous embodiment of the invention relating to the orientation of the sheet-shaped illumination light relative to the focus plane of a microscope objective when applying the SPIM method:

a reference structure in the form of an inhomogeneous intensity distribution is applied to the illumination light and/or at least one reference object which is made of a fluorescing substance or has a fluorescing substance and which has a structure which can be used as a reference structure is positioned next to or in the sample, and/or a characteristic structure of the sample is determined as a reference structure, images of the reference structure of the illumination light, of the reference structure of the reference object or of the reference structure of the sample are recorded from at least one given detection direction and are evaluated with respect to the sharpness of their image, and then the light sheet is displaced in this detection direction into the position in which the sharpest imaging of the reference structure is achieved in an observation plane, and/or the light sheet is oriented in such a way that the reference structure is imaged in a uniformly sharp manner over the entire image field.

As was already mentioned, the light sheet is moved into the focus plane of the microscope objective when it is displaced in the detection direction, while tilting of the light sheet relative to the focus plane is compensated by the orientation of the light sheet based on the homogeneity of the imaging sharpness over the entire image field.

The essential advantages of using reference structures which originate from reference objects and which can also be impressed upon the illumination light consist in that, first, a simple in-situ adjustment of the light sheet is possible when applying selective plane illumination microscopy (SPIM) and, second, the computing effort in the reconstruction of the three-dimensional image of the sample is substantially reduced compared to the prior art when reference objects are used.

In another embodiment, the orientation of the light sheet can be carried out automatically in that the light sheet is moved through the sample space in z-direction during which an image stack is recorded, an evaluation of this stack is carried out with respect to the contrast of the individual images, the optimal light sheet position relative to the focus plane of the microscope objective is determined based on the contrast, and the light sheet is moved into this position by means of an adjusting device.

It is also conceivable and likewise lies within the scope of the invention that the method steps for adjusting the light sheet and the method steps for reducing computation in reconstructing the three-dimensional image of the sample based on the image information acquired from the sample are based on a sample structure suitable as a reference structure instead of on a reference structure originating from a reference object. In this case, the sample simultaneously takes on the function of a reference object within the meaning of the invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
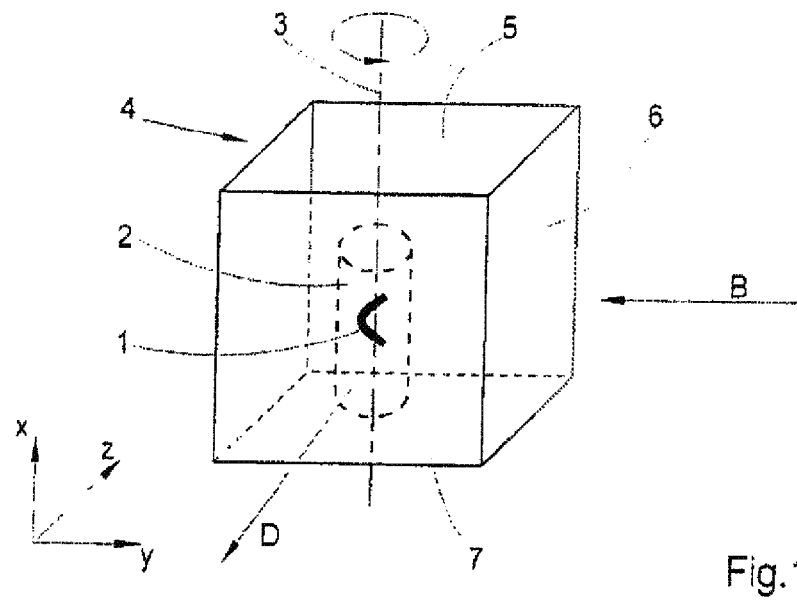
FIG. 1 a schematic view illustrating the principle of microscopic recording of a three-dimensional image of a sample using the single plane illumination microscopy (SPIM) method.

As can be seen from FIG. 1, a sample 1 is embedded in a gel which is shaped to form a circular cylinder 2. The circular cylinder 2 is located in a sample chamber 4 and is supported inside the sample chamber 4 so as to be rotatable around an axis of rotation 3 and displaceable translationally in coordinate directions X, Y, Z together with the sample 1.

The sample 1 is a three-dimensional object, for example, a biological substance. The circular cylinder 2 with the enclosed sample 1 is filled with an immersion medium, for example, water or PBS (phosphate buffered saline). The sample chamber 4 is open at its upper side so that the gel with the enclosed sample 1 and the immersion medium can be introduced from the top.

If water is provided as immersion medium, the gel can be made of mixture of approximately 98% water and 2% agarose. When a different immersion medium is used, other materials can be used for embedding the sample 1; for example, glass cylinders filled with a liquid can also be used. The walls of the sample chamber 4 can be made of glass or some other transparent material with a suitable refractive index.

A laser light source (not shown) radiating a light bundle at a wavelength of, e.g., 488 nm is provided for illuminating the sample. It is advantageous when the radiation intensity in the cross section of this light bundle is initially homogenized with suitable optical means before proceeding to be shaped as a light sheet.

The shaping of the light sheet is carried out either directly, e.g., through cylindrical optics, or as a quasi light sheet through the scanning of a line-shaped beam over the object field.

The illumination light shaped as the light sheet passes through the sample chamber wall 6 in direction of arrow B into the immersion medium and must be positioned in such a way that it there illuminates the focus plane of a microscope objective (not shown).

In the prior art, this orientation of the light sheet relative to the focus plane is difficult when the sample is already located in the sample space because a so-called in-situ adjustment is required in that case. In so doing, it cannot be assumed that the plane of the sample which overlaps the focus plane of the objective following a rough preliminary positioning contains high-contrast structures on whose basis the overlapping between the light sheet and focus plane can be determined beyond doubt when the light sheet passes through in z-direction.

In contrast to the prior art in which an adjustment of this type is carried out by means of mirrors, the invention allows the adjustment to be carried out based on a known reference structure which is introduced into the sample space next to the sample indirectly or directly.

When using a reference structure generated directly by means of reference objects, it must be ensured that at least a portion of this reference structure is already situated in the focus plane of the detection objective before the adjustment of the light sheet is carried out. This is accomplished either by using a large number of reference objects which are distributed substantially uniformly over the sample space or by a separate adjustment by means of another contrasting method, e.g., in conventional transmitted light microscopy.

When using an indirect reference structure in which the light of the light sheet is structured, a method step of this kind is not required.

If the sample is then positioned in a desired manner relative to the focus plane and accordingly also relative to the adjusted light sheet, a plane of the sample 1, namely, the plane located in the focus plane, is illuminated.

In so doing, a portion of the illumination light that is reflected or scattered by the sample 1 passes through the sample chamber wall 7 out of the sample chamber 4 as detection light in the detection direction designated by arrow D and is collected by the microscope objective.

In the prior art, image information is initially acquired from the detection direction indicated by arrow D from the plane of the sample 1 that is actually located in the focus plane by the microscope, whose functional part is the microscope objective. The sample 1 is then repeatedly displaced by a given amount or continuously in direction of coordinate Z. In so doing, by means of a spatially resolving optoelectronic converter, preferably a CCD camera, image information is acquired from the planes of the sample 1 which are located in the illuminated focus plane and is digitized and subsequently electronically stored so as to be correlated with its spatial coordinates X, Y, X. A three-dimensional image of the sample is already obtained at this stage; however, its quality is generally still severely limited by the shadow effects and aberrations caused by the sample. Further, the resolution is generally inhomogeneous because it is determined laterally by the numerical aperture of the detection objective and axially by the light sheet thickness.

According to the invention, the detection direction is changed repeatedly by rotating the sample 1 around the axis of rotation 3, and image information is acquired again from each changed detection direction from different depth planes of the sample 1 and is stored in a spatially resolved manner.

A three-dimensional image of the sample 1 which is substantially free from image artifacts such as shadows caused by opaque constituents of the sample and aberrations is electronically reconstructed by registration and fusion from the stored image information that was obtained from all of the given detection directions. At the same time, an extensively uniform resolution is achieved in this method.

In this case, there would still be the disadvantage of the relatively high requirement for computing capacity resulting from the fact that the image artifacts affect different areas of the sample depending on the detection direction, which hampers registration based on comparison of structures. Further, the amount of image information of the sample is extremely extensive and, therefore, direct processing is possible only to a limited extent.

For example, an image stack of 1000×1000×1000 image pixels is recorded in coordinates X, Y, Z at 16 bits by a commercial CCD camera for every given detection direction in order to obtain image information. In so doing, the amount of data to be acquired and processed already amounts to 16 GB.

When detection is carried out from only four different directions, for which the sample 1 is rotated by 90° in each instance around the axis of rotation 3, the amount of data to be acquired and processed is 64 GB. If the difficulties mentioned above with respect to evaluation are still to be overcome, the total expenditure is so great that conventional commercially available computer systems are overtaxed.

For this purpose, the invention provides that, in addition to the image information from the sample 1, image information of one or more reference objects positioned next to the sample 1 or in the sample 1 is also acquired from each of the given detection directions and is stored in a spatially resolved manner together with the image information of the sample 1, and the spatial coordinates X, Y, Z of the image information obtained from the reference object or reference objects is taken as a basis for the reconstruction of the three-dimensional image of the sample 1.

Specifically to this end, the registration is carried out exclusively on the basis of the substantially smaller amount of image information obtained from the reference structure, and a transformation rule in the form of a matrix is determined therefrom and is then applied to the image information of the actual sample. The image stacks of the sample structure which are registered after applying the transformation are then fused to form a three-dimensional picture.

In a first application example of the method according to the invention which will be explained in the following, the sample in the form of a zebrafish embryo which is dyed with enhanced green fluorescent protein (EGFP) and accordingly fluoresces green when excited is embedded in an agarose gel. A three-dimensional image of this zebrafish embryo is to be recorded by means of the above-described method of single plane illumination microscopy (SPIM).

According to the invention, red-fluorescing particles, for example, small polystyrene beads tagged with BODIPY 630 dye are embedded in the agarose gel along with the zebrafish embryo. The concentration of these particles is high enough that they are distributed over the sample space within the sample chamber virtually homogeneously.

Figure 2:
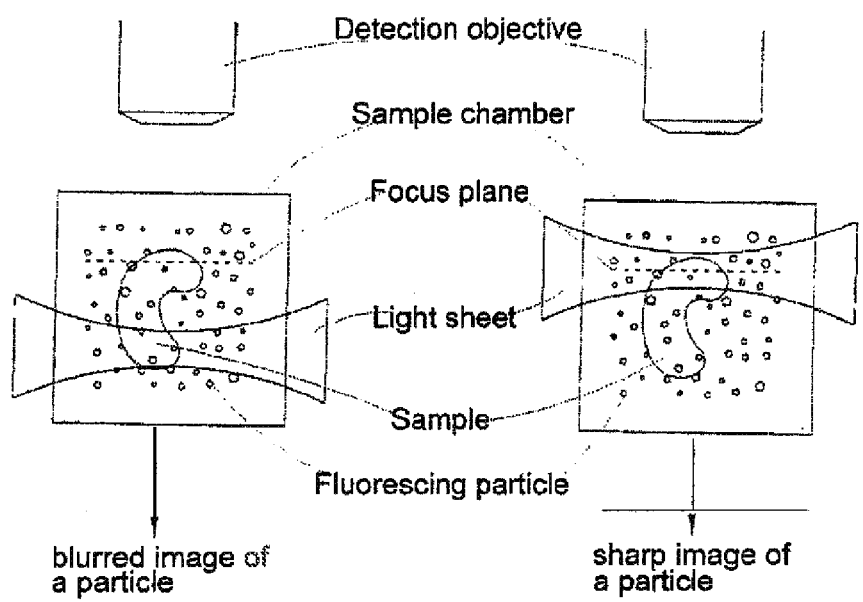
FIG. 2 a first embodiment example of the method according to the invention in which a sample in the form of a zebrafish embryo which is dyed with enhanced green fluorescent protein (EGFP) and therefore fluoresces green when excited is embedded in agarose gel and fluorescing particles are used as reference structure.

Using these particles, the light sheet can be adjusted in a simple manner as is illustrated in FIG. 2. To this end, the light sheet is moved over the sample in z-direction and irradiates the fluorescing particles as well as the sample.

As long as the light sheet radiates into the sample chamber outside the focus plane, there will be a weak, blurred image of the particles located therein as is shown on the left-hand side of FIG. 2. The gel surrounding the sample is not shown in the drawing for the sake of clarity.

This changes as soon as the light sheet radiates into the focus plane as is shown on the right-hand side of FIG. 2. The particles are sharply imaged and the light sheet is adjusted at this location.

In an advantageous manner, the adjustment steps can take place automatically. For this purpose, in the simplest embodiment form, the light sheet is moved through the sample space in z-direction and an image stack is recorded. This stack is then evaluated, for example, with respect to the contrast of the individual images, so that the optimal light sheet position can be determined quickly.

After the adjustment of the light sheet, the actual image recording is carried out. For this purpose, image information from a plurality of planes lying at different depths in the zebrafish embryo is first acquired from a given detection direction along with the image information of the particles, and this image information is stored in a spatially resolved manner. The detection direction is then changed repeatedly and image information is in turn acquired from each changed detection direction from planes of different depths in the zebrafish embryo and particles and is stored in a spatially resolved manner.

The computing capacity required for processing the image information of the sample acquired in this way to arrive at a three-dimensional image of the sample can be reduced according to the invention as will be explained in the following.

For example, if one hundred the particles are acquired microscopically for each detection direction, the data in the ideal case of a monochrome picture of these particles is reduced to 100 bits per detection direction. For a data reduction of this kind, the total image, which generally initially contains the image information of the sample and particles, must first be segmented i.e., the particles structures are separated from the sample structures by filtering, the coordinates of the particle positions are acquired and are then stored as a monochrome model.

In the case of a sample fluorescing in the green spectral region, the filtering can be carried out by spectral separation using hardware. The resulting relatively small amount of data can easily be processed in real time by commercial computers, especially as the particle emission should be substantially unaffected by image artifacts caused by the sample.

The particles form 100 fixing points on the basis of which displacements, rotations and deformation of the sample substance are calculated from one detection direction to the other and then corrected computationally.

The size of the particles is advantageously selected in such a way that they do not have a scattering effect and also do not act like spherical lenses in the sample, in this case, the zebrafish embryo, and therefore cannot result in excessive artifacts. The size of the particles is preferably 100 nm to 1 µm.

To obtain the image stack from, e.g., four detection directions, the gel with the enclosed zebrafish embryo and the enclosed particles is first placed in the sample chamber in a first viewing direction of the microscope objective on the zebrafish embryo and the particles, and image information of a first image stack is recorded. The gel with the zebrafish embryo and the particles is then rotated by 90° around the axis of rotation, and image information of a second image stack is recorded. Similarly, a 90-degree rotation is then carried out twice and a third and fourth image stack is recorded.

To summarize, substantially the following method steps are carried out:
  the light sheet is adjusted, advantageously automatically, based on the particles in that the light sheet is moved over the sample space in z-direction and the images obtained in so doing are evaluated for maximum sharpness,
  the sample is focused in a region of interest (RIO) by displacement in z-direction,
  a detection filter is selected so that the particles stand out against the background with a sufficiently good signal,
  a first image stack is acquired from the first detection direction (0°), where the image stack is recorded once for green fluorescence and immediately thereafter a second time for red fluorescence so that image information of the sample (green) and image information of the particles (red) is acquired, or both color channels, red and green, are recorded simultaneously by means of a detection system suitable for spectral splitting,
  the sample is rotated by 90° for orientation in three additional detection directions which consequently enclose angles of 90°, 180° and 270° with the first detection direction; another image stack is recorded for the green fluorescence and for the red fluorescence from each of these detection directions, wherein the image information overlaps in the image stacks.

As a result, there are four image stacks each for the green fluorescence and the red fluorescence from viewing directions on the sample which are offset by an angle of 90° relative to one another.

The three-dimensional image of the sample is reconstructed from the resulting image information, for example, in that a segmentation is carried out for the red fluorescence for purposes of data reduction in such a way that a three-dimensional monochrome model is formed. This is followed by the registration of the image stacks obtained with the red fluorescence, i.e., the necessary transformation operators are determined for each image stack, e.g., in the form of a matrix, for translation, rotation and deformation which are suitable for making the image information of each image stack overlap with the image information of the other image stacks.

The transformation operators determined in this way are then applied to the green channel, i.e., to the image stack obtained with the green fluorescence, which results in registered image stacks with image information of the sample. The latter are combined by a fusion step resulting in an individual high-quality three-dimensional image of the sample.

In a second application example of the method according to the invention, a dyed polyester or polystyrene thread instead of the fluorescing particles is embedded in agarose gel next to the sample, for example, a zebrafish embryo.

For adjusting the light sheet, it must be ensured that a portion of the thread is located in the focus plane of the detection objective. To this end, the thread can first be moved in z-direction together with the sample by evaluation of a simple transmitted light contrast until it is located at least partially in the focus plane, which can be judged based on the sharpness of its imaging. The light sheet is then oriented in such a way that the portion of the thread located in the focus plane is also sharply imaged in SPIM mode.

Subsequently, image stacks are recorded from different detection directions by the method steps described above such that at least one identical portion of the fiber always appears in the image stacks. Since the amount of image information of the thread as well as the amount of image information of the particles in the first application example is substantially less than the amount of image information of the sample, a substantial reduction in the data volume to be processed is also achieved in this case.

In this case, also, as was explained with reference to the first application example, the three-dimensional image of the sample is reconstructed in that the same portion of the thread is first separated from the sample structure for every detection direction, which can be accomplished, for example, simply by cropping the image. In the latter case, it is advantageous when the thread is positioned just below the sample, for example, in y-direction. After this, the registration for the thread images takes place and a transformation rule in the form of a matrix is determined and then applied to the sample information that is actually of interest. The fusion is then carried out, resulting in an individual high-quality three-dimensional image of the sample.

In a third application example, a needle is embedded as reference object in an agarose gel. The tip of the needle is advantageously arranged in such a way that it is located exactly in the axis of rotation 3 (see FIG. 1).

It is likewise advantageous when the sample is also positioned in the immediate vicinity of the needle tip, which can be achieved, e.g., by pinning it on the latter.

For light sheet adjustment, it must be ensured that the needle tip is located in the focus plane of the detection objective. For this purpose, it can be moved together with the sample in z-direction by evaluation of a simple transmitted light contrast until it is sharply imaged.

The region of interest (RIO) to be recorded is selected in such way that the tip of the needle appears in the image stacks.

To start with, the image recording is greatly facilitated when the needle tip is positioned in the axis of rotation 3 and the sample is placed in its immediate vicinity because the sample generally does not move out of the image field during a rotational movement. Further, it is clear that the absolute position of the needle tip has not changed during the rotational movement and, therefore, presents a fixing point. That is, when the positions of the sample structures for each image stack are determined relative to the needle tip, only a simple rotational movement is required for the registration, because the needle tip does not undergo any translational movement. Therefore, the registration algorithms proceed very efficiently.

Another advantage in using a needle tip consists in that it can be used to calibrate the drives provided for an automatic adjustment of the light sheet.

Figure 3:
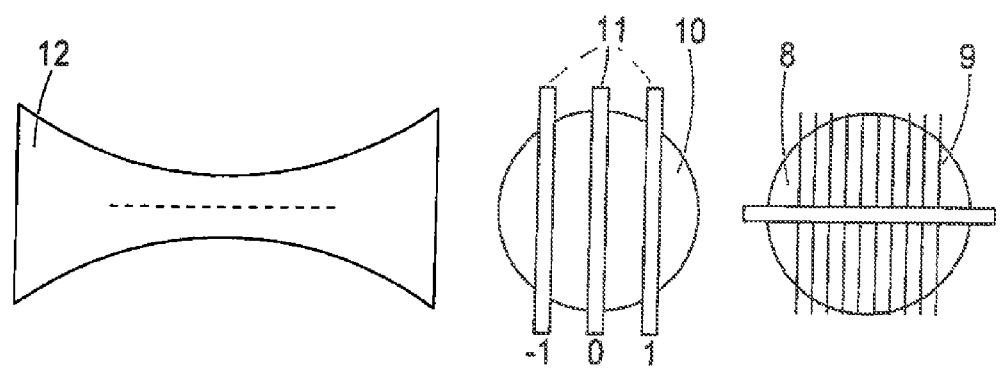
FIG. 3 a second embodiment example with a reference structure which is impressed on the light sheet by means of a grating.
Figure 3:
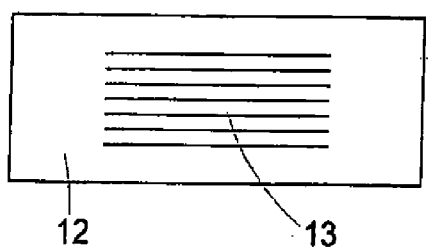

In a fourth application example, an indirectly generated reference structure in the form of a structured light sheet is used. The reference structure can be generated, for example, as is shown in FIG. 3.

For this purpose, a grating 9 is positioned in a plane 8 conjugate to the object space. Different diffraction orders 11 then result in the pupil plane 10 of the illumination objective, and an image of the grating is in turn formed in the sample space.

This grating causes an intensity distribution which is modulated over the width of a light sheet 12. In FIG. 3a, the intensity distribution of the light sheet 12 is shown in a side view on the object plane of a detection objective (not shown), the light sheet 12 being oriented perpendicular to the drawing plane, and the reference structure 13 (see FIG. 3b) lies in the range of the depth of field of the illumination objective. The clashed line in the light sheet 12 in FIG. 3a represents the range of the depth of field.

The intensity distribution of the light sheet 12 causing the reference structure 13 is shown in FIG. 3b in a top view of the object plane.

Figure 4:
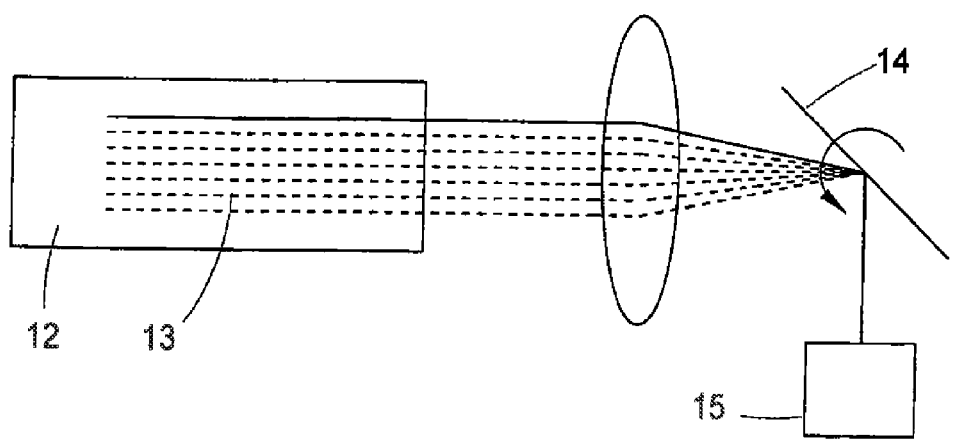
FIG. 4 a third embodiment example in which the reference structure is generated in the form of a structured quasi light sheet by the movement of a scanner mirror and temporal beam modulation.

A comparable intensity distribution is also yielded, for example, by an arrangement or process as shown in FIG. 4.

The light sheet 12 is generated here as a quasi light sheet through the movement of a scanner mirror 14 in a pupil plane of the illumination beam path. A substantially line-shaped beam is accordingly moved over the image field of the detection objective.

In this process, it must always be ensured that the integration period of the image recording is greater than or equal to the scanner period and is synchronized as far as possible with the scanner movement in order to prevent temporal intensity modulations in the image recording.

In order to generate the spatial structuring, a deliberate temporal modulation can be introduced in addition, e.g., by using an acousto-optical modulator 15, so that a reference structure 13 results in the sample space due to a reseau pattern in the intensity distribution.

Figure 5:
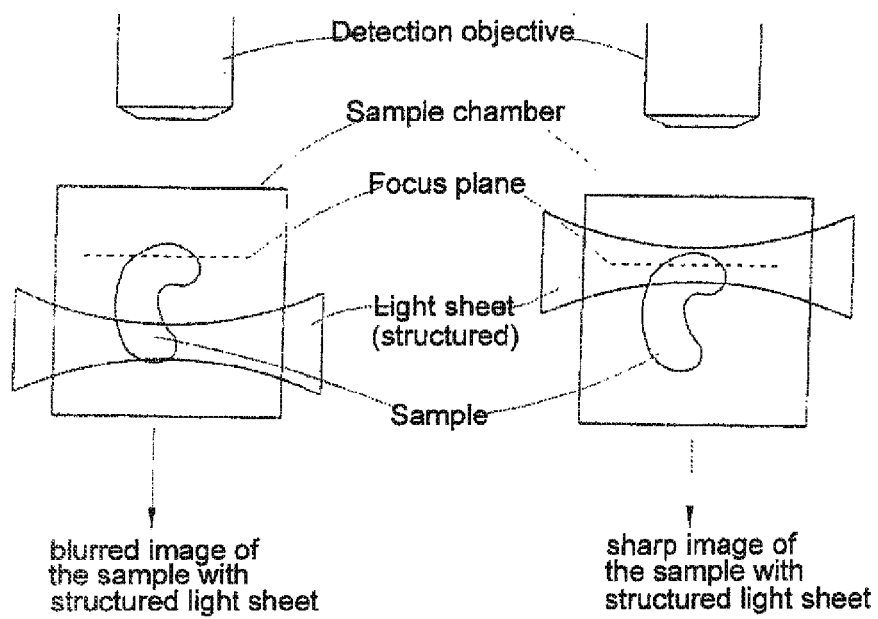
FIG. 5 a fourth embodiment example illustrating the light sheet adjustment based on a light sheet on which a reference structure is impressed.

When the fluorescing sample is illuminated by the structured light sheet, the fluorescence proceeding from the sample is also spatially modulated. The grating is then clearly visible in the image recording when the light sheet overlaps with the focus plane of the detection objective as is shown on the right-hand side of FIG. 5. However, when the light sheet is out of alignment and does not overlap with the focus plane, the grating is virtually undetectable as is illustrated on the left-hand side of FIG. 5.

Therefore, the grating image can be used for very accurate adjustment of the light sheet. The sample is not sufficient by itself because it has a defined structure only in exceptional cases.

As was mentioned above, two variants are possible according to the invention for adjusting the light sheet; namely, on the basis of a directly generated reference structure by means of reference objects for one, and, for another, based on an indirectly generated reference structure in the form of a given intensity distribution.

The advantage of using an indirectly generated reference structure over a directly generated reference structure is that the sample can be acquired after adjustment without interference from any reference objects in the normal SPIM mode either by simply removing the grating from the beam path or by halting the temporal intensity modulation during the scanner movement.

However, a disadvantage compared to the use of reference objects consists in that indirect structuring cannot be used to reduce the computing capacity in the three-dimensional imaging of the sample.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 1 sample
2 circular cylinder
3 axis of rotation
4 sample chamber
5 upper side
6, 7 sample chamber wall
8 plane conjugate to the object space
9 grating
10 pupil plane
11 diffraction orders
12 light sheet
13 reference structure
14 scanner mirror
15 acousto-optical modulator
B, D arrow direction

What is claimed is:

1. A method for microscopic three-dimensional imaging of a sample by selective plane illumination microscopy in which image information from different depth planes of the sample in a depth direction is acquired by a microscope apparatus and is stored in a spatially resolved manner so as to be correlated to its spatial coordinates X, Y, Z, and in which the three-dimensional image of the sample is reconstructed electronically from the stored image information, the method comprising:

positioning at least one reference object, comprising a fluorescing substance and having a reference structure, next to or in the sample, which also comprises a fluorescing substance;

illuminating the sample with an excitation beam from a light source, which excitation beam is shaped as a light sheet;

a first acquiring step of acquiring, via the microscope apparatus having a microscope objective, reference-object image information from the reference object from a detection direction;

a first storing step of storing the reference-object image information acquired from the detection direction in spatial coordinates X, Y, Z;

a second acquiring step of acquiring, via the microscope apparatus having the microscope objective, depth-plane sample image information from different depth planes of the sample from the detection direction;

a second storing step of storing the depth-plane sample image information acquired from the detection direction in spatial coordinates X, Y, Z;

changing the detection direction, relative to the sample and relative to the reference object, to a different detection direction;

repeating the first acquiring and storing steps and the second acquiring and storing steps for the different detection direction;

obtaining mathematical transformation operators for translation, rotation and deformation based on the spatial coordinates X, Y, Z of the stored reference-object image information so that image information from the same source from the different detection directions can be overlapped; and reconstructing a three-dimensional image of the sample from the spatial coordinates X, Y, Z of the stored depth-plane sample image information based on these transformation operators;

wherein the first acquiring step is performed before, after, or simultaneously with the second acquiring step.

2. The method according to claim 1, further comprising the steps of:
applying a reference structure in the form of an irregular intensity distribution to the illumination light;
recording and evaluating images of the reference structure of the illumination light, of the reference structure of the reference object, or of a sample structure which is suitable as a reference structure prior in time to the acquisition of the reference-object image information and the depth-plane sample information from at least one of the given detection directions, with respect to a sharpness of their imaging; and
displacing the light sheet in the detection direction into a position in which the sharpest imaging of the reference structure is achieved in an observation plane, and/or the light sheet is oriented in such a way that the reference structure is sharply imaged in a homogeneous manner over the entire image field.

3. The method according to claim 2, further comprising the steps of:
moving the orientation of the light sheet in a way that the light sheet is moved through the sample space in a z-direction;
recording an image stack during the moving step; and
evaluating the image stack with respect to the contrast of each of a plurality of individual images of the image stack;
wherein the optimal light sheet position relative to the focus plane of the microscope objective is determined based on the contrast, and the light sheet is moved into this position by means of an adjusting device.

4. The method according to claim 1;
wherein the reference-object image information and the depth-plane sample image information are acquired based on the emission radiation whose wavelengths differ from one another.

5. The method according to claim 1;
wherein the transformation operators are related to their respective spatial coordinates X, Y, Z in the form of a rule for translation, rotation, and deformation of the image information which is acquired from the individual detection directions and stored; and
wherein the rule is used in the reconstruction of the three-dimensional image of the sample.

6. The method according to claim 1;
wherein the orientation of the light sheet is carried out automatically based on the results of the evaluation of the contrast of individual images of the image stack.

7. The method according to claim 1;
wherein an object comprised at least partially of fluorescing material is used as reference object.

8. The method according to claim 1;
wherein a plurality of reference objects in the form of fluorescing particles are used.

9. The method according to claim 8;
wherein at least three fluorescing particles in the form of small polystyrene beads which are marked with a dye and have a diameter in the range of 100 nm to 1 µm are used and are embedded together with the sample in a gel.

10. The method according to claim 1;
wherein the sample is dyed with enhanced green fluorescent protein causing the sample to fluoresce green when excited.

11. The method according to claim 1;
wherein the sample and the at least one reference object are illuminated by an excitation beam with a wavelength of 488 nm.

* * * * *